United States Patent

Kristoffersen

[11] Patent Number: 6,039,692
[45] Date of Patent: Mar. 21, 2000

[54] METHOD AND APPARATUS FOR PROCESSING ULTRASOUND SIGNALS

[75] Inventor: Kjell Kristoffersen, Oslo, Norway

[73] Assignee: Vingmed Sound A/S, Horten, Norway

[21] Appl. No.: 09/099,919

[22] Filed: Jun. 19, 1998

[51] Int. Cl.[7] .................................................. A61B 8/00
[52] U.S. Cl. ............................................................. 600/454
[58] Field of Search .................................. 600/454, 455, 600/447, 438, 456, 453

[56] References Cited

U.S. PATENT DOCUMENTS 4,966,153 10/1990 Nakamura et al. ..................... 600/454
5,109,857 5/1992 Roundhill et al. ..................... 600/455
5,177,691 1/1993 Welles et al. .......................... 600/455
5,513,640 5/1996 Yamazaki et al. ..................... 600/454

*Primary Examiner*—Maulin Patel
*Attorney, Agent, or Firm*—Blakely, Sokoloff, Taylor & Zafman, LLP

[57] ABSTRACT

Methods and apparatuses for processing ultrasound signals. An approximation signal is generated to approximate an undesirable component of an input signal. The input signal may represent an ultrasound (e.g., Doppler) echo from a body. The approximation signal is used to remove the undesirable component from the input signal, leaving an output signal, which may be further processed by an ultrasound measurement and/or imaging system.

44 Claims, 7 Drawing Sheets

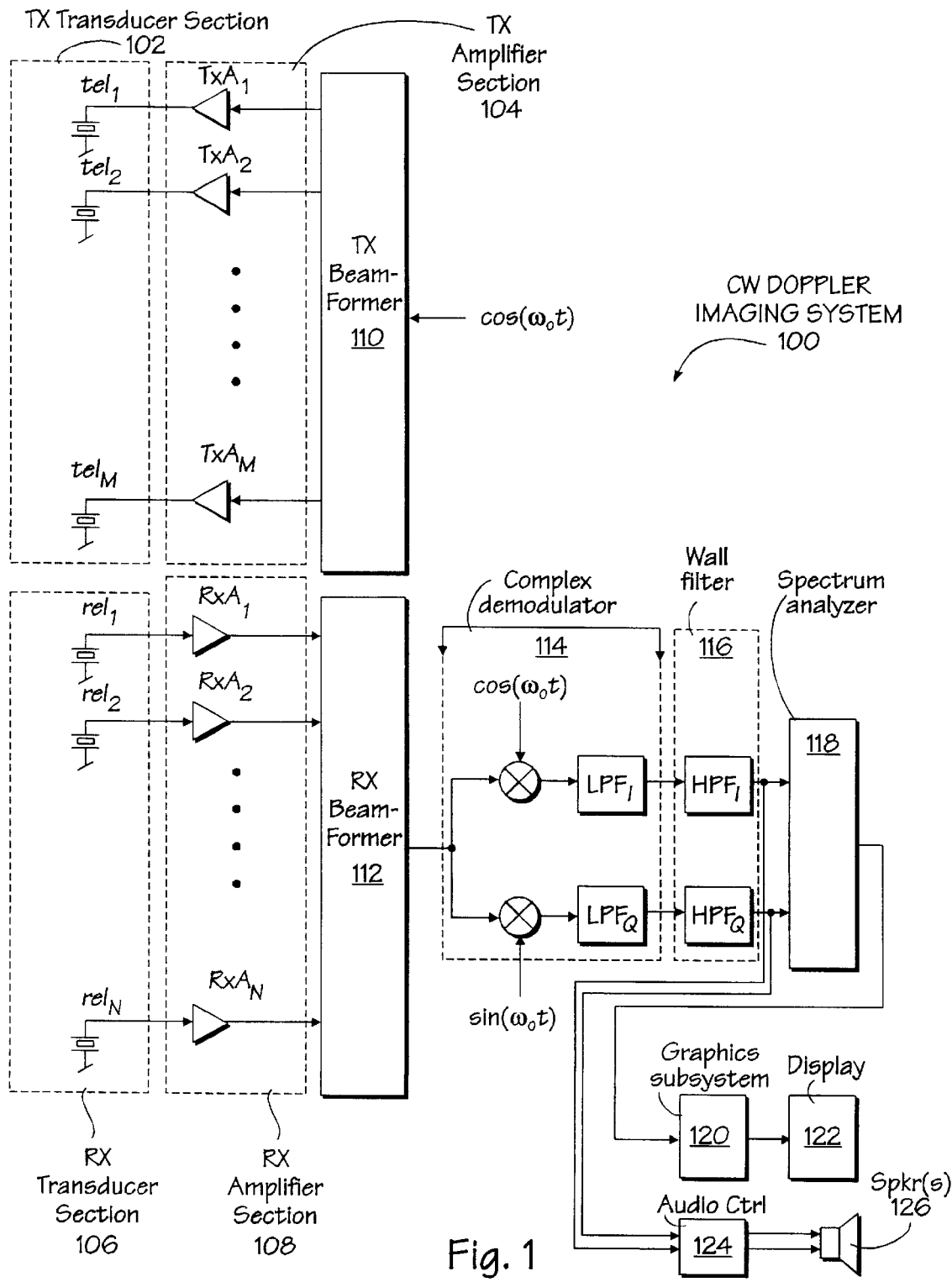

METHOD AND APPARATUS FOR PROCESSING ULTRASOUND SIGNALS

BACKGROUND OF THE INVENTION

1. Field of the Invention

The invention relates to the field of ultrasound imaging. More specifically, the invention relates to the field of signal processing in ultrasound systems which may employ Doppler.

2. Background Information

Various techniques and systems may be used to obtain images of the interior of a body and/or flow structures within a body. (A body is used herein to refer to various types of subjects, such humans, animals, non-living structures, etc., while flow structure as used herein may refer to a region of fluid flow such as occurring in veins, arteries, etc.) Some of these imaging techniques include magnetic resonance imaging (MRI), CT, and ultrasound. Among such techniques, ultrasound Doppler, which processes echoes (i.e., received signals based on transmitted signals), has provided relatively substantial convenience and cost efficiency, to both the equipment operator and the subject (body), compared to the X-ray, MRI and CT imaging techniques.

Continuous wave (CW) Doppler and pulsed wave (PW) Doppler are two examples of ultrasound Doppler imaging techniques often utilized in medical applications. CW Doppler is typically utilized to measure the velocity of blood or other fluid flow within a body. In applications wherein the velocity of the fluid flow may be relatively large, the modality of CW Doppler may be particularly useful, since CW Doppler, unlike PW Doppler, is generally not limited with respect to the magnitude of the maximum velocity that can be measured. As such, CW Doppler may be utilized, for example, to measure the velocity of blood in certain heart lesions, wherein the velocity of fluid flow may be relatively large (e.g., up to 7 m/s or more).

OVERVIEW OF A TYPICAL CW DOPPLER ULTRASOUND SYSTEM

FIG. 1 is a block diagram of a conventional ultrasound imaging system that may be operated in CW Doppler mode. In FIG. 1, a CW Doppler system 100 is shown, which includes a transducer array depicted by two sections, a transmit (Tx) section 102 and a receive (Rx) section 106, comprising of M and N elements, respectively. The Tx section 102 may transmit an ultrasound signal with frequency $f_0$ into a body, and the Rx section 106 may be used for reception of the signal, corresponding to the transmitted signal, which is reflected from the body. Typically M and N will be of similar magnitude (i.e., the two transducer sections 102 and 106 may have approximately the same number of transmit and receive elements). The Tx transducer section 102 is coupled to a Tx amplifier section 104, and the Rx transducer section 106 is coupled to a Rx amplifier section 108, to provide signal level gain.

A transmit (Tx) beam former 110, coupled to the Tx amplifier section 104, generates individually delayed versions of an excitation waveform so that the beam can be steered and focused to a desired point in space. Each transmit element of the Tx section 102 is excited by its corresponding transmit amplifier TxA of the Tx amplifier section 104.

Similarly, a receive (Rx) beam former, coupled to the Rx amplifier section 108, may steer and focus a receive beam into the desired point in space. The sample volume (the region of sensitivity) for the CW Doppler occurs where the Tx and the Rx beams overlap.

The output from the Rx beam former 112 is passed through a complex demodulator 114, which is shown having two multipliers with subsequent low-pass filters. The low-pass filters included of the complex demodulator 114 may be utilized, in part, to reduce or eliminate undesired mixer products, for example, at two times the center frequency. Additionally, the low-pass filters of the complex demodulator 114 may be used to limit the noise bandwidth to correspond to the bandwidth of the subsequent spectrum analysis described below with reference to a spectrum analyzer 118.

Each quadrature component from the complex demodulator 114 is filtered through a high-pass filter (wall filter) 116, which may be used to remove relatively strong, low-frequency Doppler shifts originating from tissue and/or electrical and acoustical crosstalk between the transmit and the receive circuitry of the system 100 itself, or from the transducer. The signal from blood will not be substantially affected by the wall filter, since the blood velocity is normally much higher than the velocity of the tissue.

The outputs from the high-pass filters 116 are connected to a spectrum analyzer 118, which is typically based on a Fast Fourier Transform (FFT). The spectrum analyzer 118 may be utilized to calculate a moving-average spectrum over a time span which is short enough that the blood flow is approximately constant (e.g., in the order of 10 ms). The spectrum may be displayed on a monitor or a hard copy device, for example, sonogram format (a time-frequency format, with the log-spectral intensity modulating the intensity of the image). Accordingly, the system 100 may include, as shown in FIG. 1, a graphics subsystem 120 and a display 122, and/or other input/output (I/O) devices.

A base band signal associated with the system 100 may be provided to an operator/user of the system 100 as an audible signal. As such, the system 100 may include, as shown in FIG. 1, an audio control unit 124 and a speaker(s) system 126. For example, an operator may be able to use the audio signal for guidance purposes and as a quality control of the ultrasound measurement.

While FIG. 1 shows one example of a CW Doppler imaging system, it will be appreciated that there are several other types of CW Doppler-based systems, each employing various types of signal processing circuitry. Furthermore, it will be appreciated that most of the functions in the block diagram shown in FIG. 1 may be performed in the analog or in the digital domain. For example, the Rx beam former 112 may employ analog, digital, or a combination of analog and digital circuitry. Likewise, positioning or order of many of the circuits and systems may be rearranged without affecting the general function of the CW Doppler imaging system 100. For example, one variation may include placing the quadrature mixers up in the processing chain, for example, to perform such mixing on each individual channel (i.e., element), or possibly for a group of channels, possibly with a different phase for each mixer pair. Such an implementation may be used, for example, if part of or all of the beam forming is performed in base band or at some intermediate frequency, rather than at the ultrasound frequency. Similarly the order of the high-pass and the low-pass filters can be interchanged.

OVERVIEW OF A TYPICAL PW DOPPLER ULTRASOUND SYSTEM

As indicated by like reference numerals, some of the components and functions of the PW Doppler imaging system shown in FIG. 2A may be similar to the CW Doppler imaging system shown in FIG. 1. However, there are also some notable differences in the operation of the two systems. For example, in the PW system 200, the transmitter portion generates relatively short, coherent bursts of ultrasound, rather than a continuous wave. The bursts of ultrasound are typically controlled by the state of a Tx-gate signal, which controls a Tx/Rx switch section 202. The typical timing scheme for the Tx gate signal is shown in FIG. 2B.

The transmitter and the receiver sections (e.g., the Tx beam former 110 and the Rx beam former 112) typically share the same N transducer elements. Each element is coupled to one Tx/Rx switch of the Tx/Rx switch section 202, which alternately couples the element to the output of a transmit amplifier of the Tx amplifier section 104 (for transmission) or the input of an amplifier of the Rx amplifier section 108 (for reception), depending on the state of Tx-gate. As depicted in FIG. 2A, the Tx/Rx switches of the Tx/Rx switch section 202 are drawn in the Rx position.

The complex demodulator 114 may be utilized to limit the noise bandwidth of the system and remove undesired higher-order spectra originating from the mixing. The demodulated signal provided by the complex demodulator 114 may be range gated by the signal Rx-gate after a delay Td from pulse transmission (refer to FIG. 2B). Thus, echoes typically originate from a sample volume at a depth corresponding to the distance traveled by the speed of sound during that time, i.e., $$\text{depth} = c.Td/2 \tag{1}$$

where c is the speed of sound in the body. By varying the delay, selective sampling of echoes from virtually any depth may be provided.

The post range-gating filter 204 (designated by two BPF blocks in the FIG. 2A) typically comprises one or more hold elements and band-pass filters. In a typical analog implementation, the low edge of a band-pass filter included in the filter 204 may be utilized to remove relatively strong echoes, for example, from walls, and the high edge may be used to remove higher order spectra from the demodulation.

One advantage of PW Doppler systems relative to CW Doppler system is the range resolution provided. However, since PW Doppler is an inherently sampled system, the maximum velocity that can be measured is generally limited, for example, by the Nyquist limit for a pulsed system.

OPERATION OF DOPPLER SYSTEMS IN MIXED MODES

Sometimes, Doppler examinations are performed in so-called mixed modes, wherein Doppler measurement is performed with, for example, apparently simultaneous B-mode (Brightness Mode) imaging and/or color Doppler imaging, which two types of imaging are well known. There are several commonly used methods for building up mixed modes, such as vector interleaving and frame/subframe interleaving.

In systems that employ vector interleaving, typically every nth burst, n=2, 3, ..., is used for Doppler, and the remaining bursts are used for building up the other image modality/modalities present in the mixed mode(s). Such a technique may provide satisfactory results in some applications, but results in a reduction in the maximum pulse repetition frequency (PRF) available in PW Doppler. In some applications, such as cardiac applications where fluid velocity may be relatively high and the depth of investigation relatively large, such reduction in the maximum PRF may pose a serious limitation. Moreover such a method will not, by definition, function in a CW Doppler system.

Another way of building up a mixed mode involves frame or sub-frame interleaving. According to this method, the Doppler transmission may be interrupted for a relatively longer time interval (typically corresponding to several tens of pulses on PW Doppler), which is generally long enough to acquire either a full frame or a substantial fraction of a frame relative to the other modality(ies) present in the mixed mode. One limitation of such a technique is that the audible Doppler signal may suffer from periodic interrupts, or gaps, which reduces its usefulness for audible feedback. To alleviate this problem, some systems employ techniques to fill in the gaps by synthesizing an artificial Doppler signal with similar spectral contents as that of the missing segments.

DYNAMIC RANGE LIMITATIONS ASSOCIATED WITH CONVENTIONAL DOPPLER ULTRASOUND SYSTEMS

In addition to the limitations mentioned above, another limitation of existing Doppler systems is related to the sometimes wide dynamic range of the input signal that is to be processed by such systems. The apparent sensitivity of an ultrasound array system operating in Doppler mode may be related, for example, to the dynamic range of its beam former. In particular, such a dependency may be true for Continuous Wave and High-PRF (HPRF) PW modes. In these cases, the desired Doppler signal from blood is typically substantially weaker than the clutter echoes, for example, originating from static or slowly moving tissue. Thus, a relatively high dynamic range is required to process both signal components simultaneously.

One model for the input signal in CW Doppler involves consideration of the input signal ($x_{in}(t)$) as the sum of two or more components. In some medical applications, one component may originate from tissue ($x_t(t)$) and one component may originate from blood ($X_b(t)$), such that:

$$x_{in}(t) = x_b(t) + x_t(t) \tag{2}$$

Furthermore, it may be assumed that the combined signal from tissue and/or transmitter crosstalk may be written as:

$$x_t(t) = a_t(t).\cos(\omega_0 t + \phi_t(t)) \tag{3}$$

where $\phi_t(t)$ is a slowly varying phase. For simplicity, it may also be assumed that the signal associated with blood is a single frequency with an angular Doppler shift $\omega_b$, such that:

$$x_b(t) = a_b.\cos(\omega_0 + \omega_b)t \tag{4}$$

Unfortunately, a dynamic range problem typically occurs because the signal level associated with blood is substantially smaller than the signal level associated with tissue, i.e., $a_b| << |a_t|$. As such, a CW system, such as that shown in FIG. 1, may need to process the relatively strong tissue signal ($x_t(t)$), while maintaining sufficient linearity to process the relatively weak signal ($x_b(t)$) associated with blood. For example, in some applications, an instantaneous dynamic range on the order 120–130 dB over a 20 kHz bandwidth, may be required for such processing, which may prove expensive and/or impractical. However, once having passed through high-pass filtering, some of the relatively stronger clutter components of the input signal, as may be associated with tissue, for example, may be removed. Thus, the dynamic range of the signal provided, for example, to a spectrum analyzer may be substantially lower, e.g., on the order of 60 dB.

Ultrasound systems which employ digital beam forming (DBF) typically increase the number of bits and/or the speed of digitization for each individual analog-to-digital (A/D) converter to increase the dynamic range. However, both approaches may significantly increase the complexity and cost of an ultrasound system.

Another method sometimes used in DBF systems involves insertion of a quartz crystal notch filter into a relatively early stage of every signal processing channel, to filter out an undesired carrier component. Unfortunately, some limitations exist with such a method. For example, the quartz crystals are generally bulky, relatively expensive, and generally need to be relatively precisely matched to the carrier frequency. Furthermore, since one crystal is fixed for filtering one frequency, in a system operating on multiple frequencies and with a relatively large number of channels (e.g., a 64 Rx channel system), the crystal filtering approach may not be practical. Additionally, because of their narrow bandwidth, the crystals may be limited to certain types of Doppler ultrasound techniques, such as CW Doppler, and may not be useful in PW Doppler systems.

Thus, what is desired is an improved signal processing method and apparatus for ultrasound Doppler systems.

SUMMARY OF THE INVENTION

Methods and apparatuses are provided for processing ultrasound signals. An approximation signal is generated to approximate an undesirable component of an input signal. The input signal may represent an ultrasound (e.g., Doppler) echo from a body. The approximation signal is used to remove the undesirable component from the input signal, leaving an output signal, which may be further processed by an ultrasound measurement and/or imaging system. In one embodiment of the invention, generation of the approximation signal and/or removal of the undesirable component may be performed dynamically (i.e., as signals are being received or processed).

BRIEF DESCRIPTION OF THE DRAWINGS

FIG. 1 is a block diagram of a conventional ultrasound system that may be operated in CW Doppler mode;

DETAILED DESCRIPTION

The present invention provides methods and apparatuses to process ultrasound signals. According to one aspect of the invention, methods and apparatuses are provided to improve the performance of Doppler ultrasound systems in the presence of relatively wide dynamic ranges. In one embodiment, an undesirable component of an input signal is approximated, and an approximation signal representing such approximation is generated. Based on the approximated signal, the undesirable component of the input signal is removed from the input signal to generate an output signal. The output signal may be used for further processing. According to one aspect of the invention, the generation of the approximation signal and removal of a component of the input signal corresponding thereto are performed dynamically (i.e. while signal reception and/or processing is/are performed).

Figure 2A:
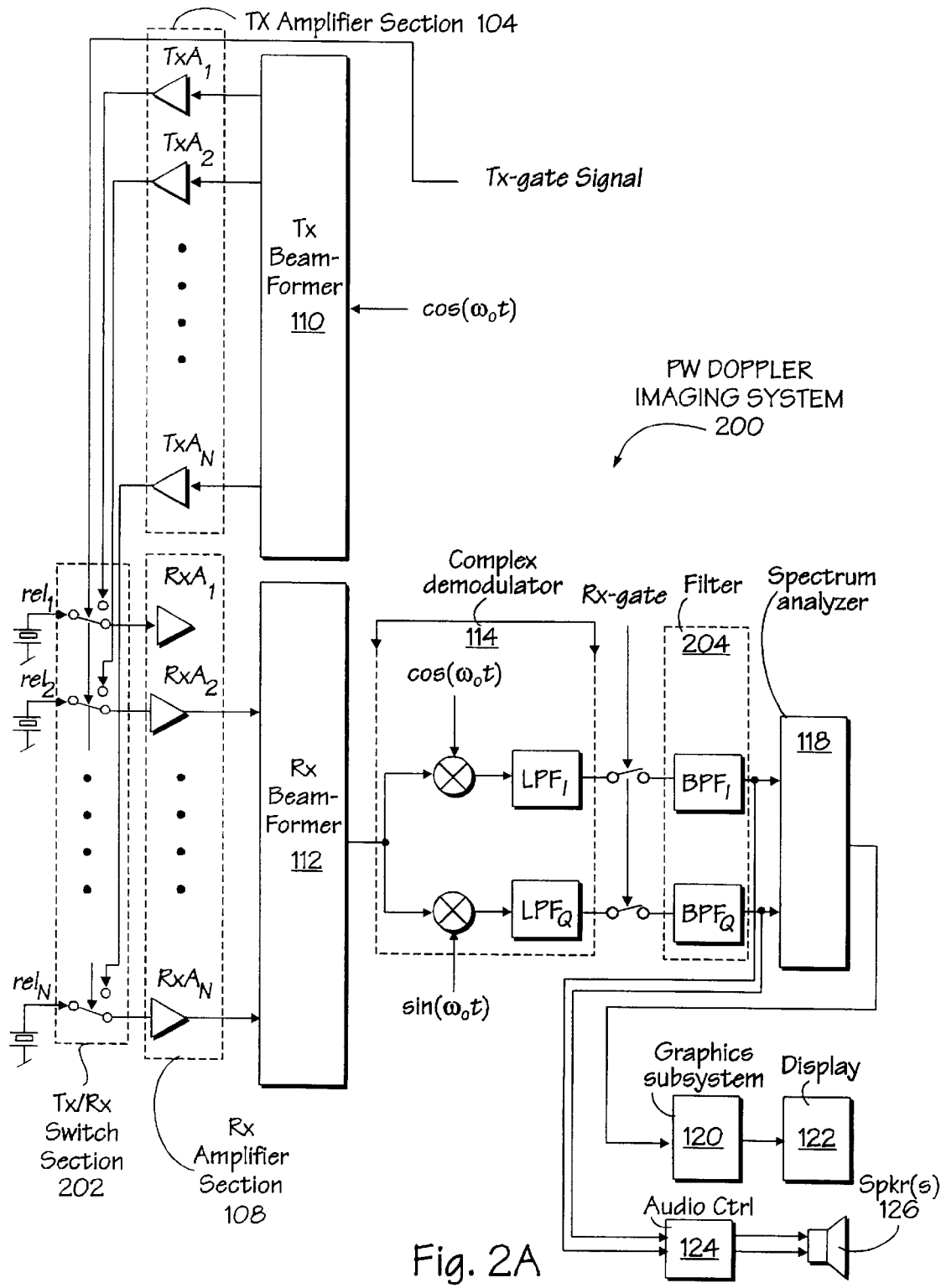
FIG. 2A is a block diagram of a conventional ultrasound system that may be operated in PW Doppler mode.
Figure 2B:
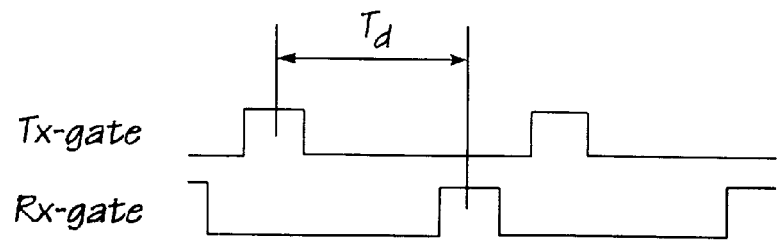
FIG. 2B is a gate timing diagram corresponding to FIG. 2A.

In one embodiment of the present invention, relatively strong, low-Doppler shift components of an input signal are removed. In one embodiment, the removal of one or more components of an input signal is performed at a relatively early stage of the processing chain, such as at the input of, or immediately subsequent to, an input amplifier (e.g., see RxAn of FIGS. 1–2) for each of the individual processing channels, prior to beam forming. According to one aspect of the invention, the methods and apparatuses of the invention may be utilized in a relatively large number of parallel processing channels occurring in an array system. Furthermore, the invention, in one embodiment, may be implemented, in part or in entirety, in an integrated circuit. It will be appreciated that the invention in alternative embodiments may be utilized at various other digital and/or analog signal processing stages of in an ultrasound system. It will also be appreciated that the present invention may find use in a variety of ultrasound systems, such as, CW Doppler, PW Doppler, operating in Doppler only or in mixed-modes, and others. Thus, the present invention should not necessarily be limited to a particular type of ultrasound system or to a particular signal processing stage in an ultrasound system.

In the following description, numerous specific details are set forth to provide a thorough understanding of the invention. However, it is understood that the invention may be practiced without these details. In other instances, well-known circuits, structures, timing, and techniques have not been shown in detail in order not to obscure the invention.

Figure 3:
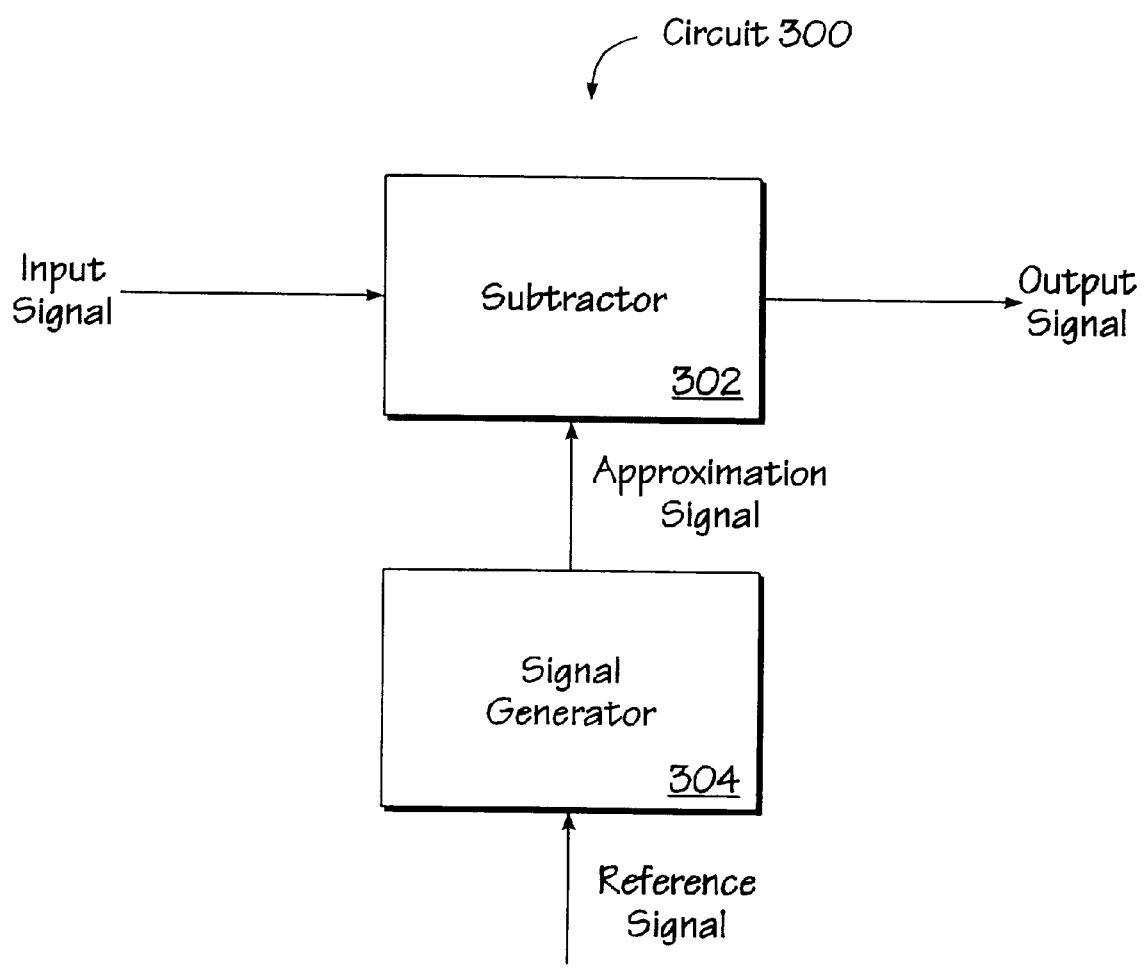
FIG. 3 is a block diagram of a circuit that may be used to process ultrasound signals, according to one embodiment of the invention.

FIG. 3 is a block diagram of a circuit that may be used to process ultrasound signals, according to one embodiment of the invention. In particular, a circuit 300 is shown, which may be used to remove one or more components of an input signal (which may represent a signal based thereon) to be processed in an ultrasound signal. The circuit 300 includes a signal generator 304. In one embodiment, a reference signal which is coherent with the transmitted ultrasound signal indicates to the signal generator 304 at least one component of the input signal to be removed. In response to the reference signal, the signal generator 304 generates an approximation signal. The approximation signal is an approximation of the (at least one) component of the input signal to be removed.

The approximation signal and the input signal are provided to a subtractor 302. In response, the subtractor 302 removes a component of the input signal corresponding to the approximation signal, and outputs the result as an output signal. The output signal represents the input signal having removed therefrom the component indicated by the approximation signal.

In one embodiment, the circuit 300 operates on the input signal at one or more channels of an Rx beam former, such as the Rx beam former shown in the systems of FIGS. 1–2, to remove an undesirable component of an input signal. However, the invention is not limited to per-channel utilization. Furthermore, the invention may be utilized at later stages of a processing chain of an ultrasound system as well. Generally, the invention may be utilized at various signal processing stages, preferably, prior to performing baseband mixing. As such, the invention may include exclusively analog circuitry, or may utilize a combination of analog and digital circuitry. Thus, it will be appreciated that in embodiments of the invention wherein digital circuitry is utilized, various combinations of hard-wired circuitry and machine-executable routines may be utilized by the present invention.

As mentioned above, the present invention, in one embodiment, involves a synthesis of a signal that is a relatively close approximation to an undesirable component of an input signal, for example, the strong, undesired low-Doppler component of Doppler signals associated with blood and tissues, and to remove (e.g., through subtraction, cancellation, etc.) the undesirable component from the input signal. Depending on the quality of the approximation obtained for the approximation signal, the output signal $x_{out}(t)$ generated following the removal of the undesirable component should generally be or at least approximate the desired component(s) of the input signal.

To provide an understanding of the invention, an example of an input signal having components associated with blood and tissue, as described above, will be used. However, it will be appreciated that the invention may be utilized to process signals originating from other types of structures, fluid/particle flow, etc., and thus, the invention should not be limited to a particular type of input signal, ultrasound applications, etc.

As described above with reference to equation (2), in one application of the present invention, an input signal $x_{in}(t)$ may represent, at least in part, the combination of a blood component $x_b(t)$ and a tissue component $x_t(t)$. The tissue component $x_t(t)$ may be considered an undesirable component of the input signal $x_{in}(t)$, since $x_t(t)$ may represent a relatively strong, low-Doppler component. Accordingly, in one embodiment of the present invention, an approximation signal $\tilde{x}_t(t)$ may be generated to approximate the undesirable tissue component $x_t(t)$, the approximation signal $\tilde{x}_t(t)$ may be removed (e.g., subtracted from) the input signal $x_{in}(t)$. Depending on the quality of the approximation obtained for the approximation signal $\tilde{x}_t(t)$, the output signal $x_{out}(t)$ generated following the removal of the undesirable component should generally be or at least approximate the desired component(s) of the input signal, which in the given example may correspond to the blood component $x_b(t)$, such that:

$$x_{out}(t) = x_{in}(t) - \tilde{x}_t(t) \qquad (5)$$
$$= x_b(t) + x_t(t) - \tilde{x}_t(t)$$
$$\approx x_b(t)$$

Thus, the dynamic range of the output signal may be reduced relative to the input signal, such that $|x_{out}(t)| << |x_{in}(t)|$.

Generally, the approximation signal $\tilde{x}_t(t)$ is generated such that its frequency is substantially equal to the transmit frequency $f_0$. As such, the approximation signal $\tilde{x}_t(t)$ may be considered as:

$$\tilde{x}_t(t) = \alpha(t) \cdot \cos(\omega_0 t + \beta(t)) \qquad (6)$$

wherein $\alpha(t)$, $\beta(t)$ are relatively slow varying amplitude and phase functions, respectively. In general, the amplitude and phase functions should be time varying due to the relatively slowly moving amplitude and phase, for example, from the tissue signal when the transducer is moved on the body surface, or when the tissue itself moves. By comparing equation (6) with equation (3), it will be appreciated that it is desirable to have $\alpha(t) \approx a_t(t)$ and $\beta(t) \approx \phi_t(t)$.

According to one embodiment of the invention, equation (6) may be transformed into other forms, which, in some implementations, may provide relatively greater simplicity or flexibility, such that:

$$\tilde{x}_t(t) = e_I(t) \cdot \cos(\omega_0 t) + e_Q(t) \cdot \sin(\omega_0 t) \qquad (7)$$

where $$e_I(t) = \alpha(t) \cdot \cos\beta(t)$$
$$e_Q(t) = -\alpha(t) \cdot \sin\beta(t) \qquad (8)$$

The formulation of equation (7) suggests that the approximation signal $\tilde{x}_t(t)$ may be generated as a linear combination of two signals which are 90 degrees phase shifted with respect to one another, and each having a frequency equal to the carrier frequency. In some CW Doppler systems, the transmitter is typically driven by such signals, and thus, may provide reference to generate the approximation signal $\tilde{x}_t(t)$.

OVERVIEW OF ONE EMBODIMENT OF THE INVENTION IN CW DOPPLER MODE

Figure 4:
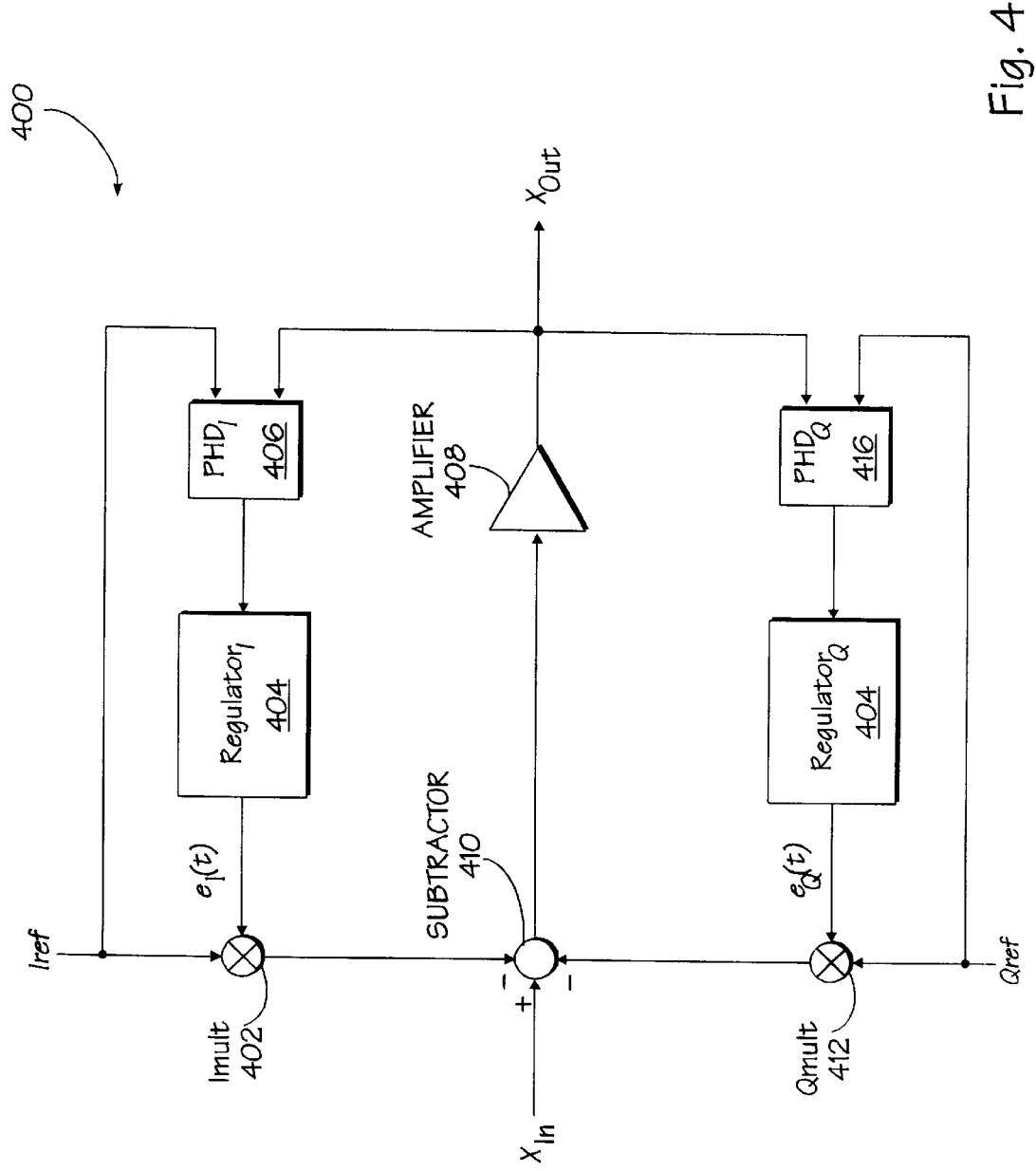
FIG. 4 is a block diagram of a circuit that may be used to process ultrasound signals in an ultrasound system that employs CW Doppler mode, according to one embodiment of the invention.

FIG. 4 is a block diagram of a circuit that may be used to process ultrasound signals in an ultrasound system that employs CW Doppler mode, according to one embodiment of the invention. In FIG. 4, a circuit 400 is shown which includes a phase detector (PHD) 406 and a phase detector (PHD) 416. One of two reference signals, Iref and Qref, which represent quadrature reference signals, is provided to one of the PHD 406 and 416, respectively. A pair of dynamic reference coefficients, $e_I(t)$, $e_Q(t)$ (e.g., see equation (8) above), are generated by comparing the phase of an output signal $X_{OUT}(t)$ with its respective reference signals, Iref and Qref, using the PHD 406 and the PHD 416, respectively. The output from the PHD 406 and the PHD 416 are fed back through a regulator 404 and a regulator 414, respectively, to generate the final reference coefficients, $e_I(t)$ and $e_Q(t)$, which are provided to a multiplier (Imult) 402 and a multiplier (Qmult) 412, respectively, which multipliers provide the two components of the approximation signal to a subtractor 410. The subtractor 410 removes the approximation signal (or component corresponding thereto) from the input signal and provides the result to an amplifier 408, which amplifies the result provided by the subtractor 410, and generates the output signal. The output signal may further processed according to known techniques. For example, the output signal may be amplified, provided to a beamformer, and/or other circuitry to provide ultrasound based measurement, imaging, etc.

The circuit 400 shown in FIG. 4 may be regarded as a closed loop, which may yield the response of a notch filter having a center frequency equal to the frequency of a reference signal. What follows is an analysis of the circuit 400 as such a filter. To aid in the understanding of this embodiment of the invention, in the following analysis, it is generally assumed that:

1. The phase detectors are an ideal four-quadrant multiplier, such that:

$$PHD_{I,Q}(t) = input_1(t) \cdot input_2(t)$$

2. The loop regulators are identical integrators with time constant $T_i$:

$$out(t) = \frac{1}{T_i} \int_{-\infty}^{t} input(t) dt$$

To aid in the analysis of the circuit 400, a complex formulation may be utilized. As such, the reference signal may be expressed as:

$$r(t) = r_0 \cdot e^{j\omega_0 t} \qquad (9)$$

(so that Iref=$r_0 \cos(\omega_0)$ and Iref=$-r_0 \sin(\omega_0)$). The input signal may be regarded as a sine wave with angular Doppler shift $\omega_d$:

$$x_{in}(t) = e^{j(\omega_0+\omega_d)t} \qquad (10)$$

Assuming linearity, the output signal may be expressed as:

$$x_{out}(t) = H(\omega_d) \cdot e^{j(\omega_0+\omega_d)t} \qquad (11)$$

wherein $H(\omega_d)$ is the transfer function of the notch filter.

Thus, the function of the circuit 400 may be described by an integral equation:

$$\frac{x_{out}(t)}{A} = x_{in}(t) - r(t) \cdot \frac{1}{2T_i} \int_{-\infty}^{t} (x_{out}(t) + x_{out}^*(t)) \cdot r^*(t) dt \qquad (12)$$

$$\approx x_{in}(t) - r(t) \cdot \frac{1}{T_i} \int_{-\infty}^{t} x_{out}(t) \cdot r^*(t) dt$$

wherein the asterisk denotes complex conjugate. The approximate integral equation can be solved by inserting equations (10) and (11) for the input and the output signals, respectively. The final result may be expressed as:

$$H(\omega_d) = A \cdot \frac{j\omega_d T_{hp}}{1 + j\omega_d T_{hp}} \qquad (13)$$

wherein the effective time constant $T_{hp}$ is given by:

$$T_{hp} = \frac{2 \cdot T_i}{A \cdot |r_0|^2} \qquad (14)$$

The transfer function is recognized to be equivalent to that of a first-order high-pass filter, having an angular cutoff frequency given by:

$$\omega_{hp} = 2\pi f_{hp} = \frac{1}{T_{hp}} \qquad (15)$$

which may be provided in baseband, for example, in the system 100 described with reference to FIG. 1. Accordingly, an input signal having an angular frequency equal to $\omega_0 \pm \omega_{hp}$ will generally undergo an amplitude attenuation of approximately 3 dB. In general, the attenuation increases by approximately 6 dB per octave reduction of $|\omega_d|$.

The approximation of equation (12) is generally valid for situations wherein the frequency of the input signal is relatively close to the frequency of the reference signal (sometimes referred to as the reference frequency), and the effective time constant is substantially larger than the inverse reference frequency, i.e.:

$$T_{hp} \cdot \omega_0 \gg 1 \Leftrightarrow f_{hp}/f_0 \ll 1 \qquad (16)$$

In such situations, the term which is neglected in equation (12) will be a zero-mean term, oscillating at the angular frequency $\omega_{in}+\omega_0$ at the output of a phase comparator (e.g., the PHD 406 or 416). As such, the term may be considered negligible relative to the low-frequency term, for example, once filtering (e.g., through an integrator) is performed.

In one embodiment of the present invention, the cutoff frequency of the high-pass filter described by equation (13) may be selected large enough, so that a subtractor, such as the subtractor 410, operates relatively efficiently with respect to Doppler shifts which may occur naturally, for example, when tissue is moving and/or the ultrasound probe is moved on the body surface. On the other hand, the cuttoff frequency generally should not be selected so high, such that the Doppler shift from a desirable input signal component (e.g., blood in the described example) is significantly attenuated. In an application such the one described above, cutoff frequencies may be used in the order of 100–1000 Hz. In generally, ultrasound frequencies typically fall in the range of 2–20 MHz. However, the invention may be extended to operate in other ranges of frequencies.

The approximation shown in equation (12) may be utilized in alternate embodiments of the invention which, for example, use a complex version of $x_{out}(t)$. Such an output signal may be generated, for example, by known Hilbert transform methods.

It is generally desirable to have the reference signals Iref and Qref have a relatively high spectral purity, in the vicinity of the carrier frequency. As such, high amplitude stability and low phase jitter should generally be provided to prevent noise from being injected directly into a signal path. Likewise, it is generally desirable that the reference multipliers Imult 402 and Qmult 412 not add substantial noise within the pass band of Doppler operation.

On the other hand, in one embodiment of the invention, a relatively large degree of harmonic distortion of an approximation signal, such as $\tilde{x}_r(t)$, may be tolerated. In one embodiment of the invention, a transmitter which contains a relatively substantial amount of distortion (e.g. more similar to a square wave than a sine wave) may be employed. In alternative embodiments of the invention, a notch filter which does not provide a near-perfect null at the center frequency may not be employed (an attenuation of, for example, 6–10 dB at the center frequency may be sufficient).

Therefore, the reference signal may also contain harmonics, and thus, may not be an ideal sinewave. In one embodiment, the reference signal generally has the same shape as the input signal.

Also, it will be appreciated that the reference multipliers Imult 402 and Qmult 412 may not necessarily function as ideal multipliers. As such, in one embodiment of the invention, a relatively substantial amount of harmonic distortion may be tolerated at the output of the reference multipliers. In one embodiment of the invention, the transfer function from $e_I$ or $e_Q$ to amplitude may be monotonic, but may not necessarily be linear, at least not in the feedback topography.

In one embodiment of the invention, one of the inputs to a reference multiplier (e.g., the reference input) is an RF-signal, whereas the second input is may be relatively slow varying. As such, in one embodiment of the invention, a circuit which employs voltage controlled resistors may be utilized.

It will also be appreciated that in alternative embodiments of the invention, the two reference signals may not necessarily be 90 degrees out of phase or have exactly the same amplitude.

OVERVIEW OF ONE EMBODIMENT OF THE INVENTION IN PW DOPPLER MODE

The present invention, in one embodiment, may be utilized even in a PW Doppler mode, as described below with reference to FIG. 5 and one embodiment of the invention.

Figure 5:
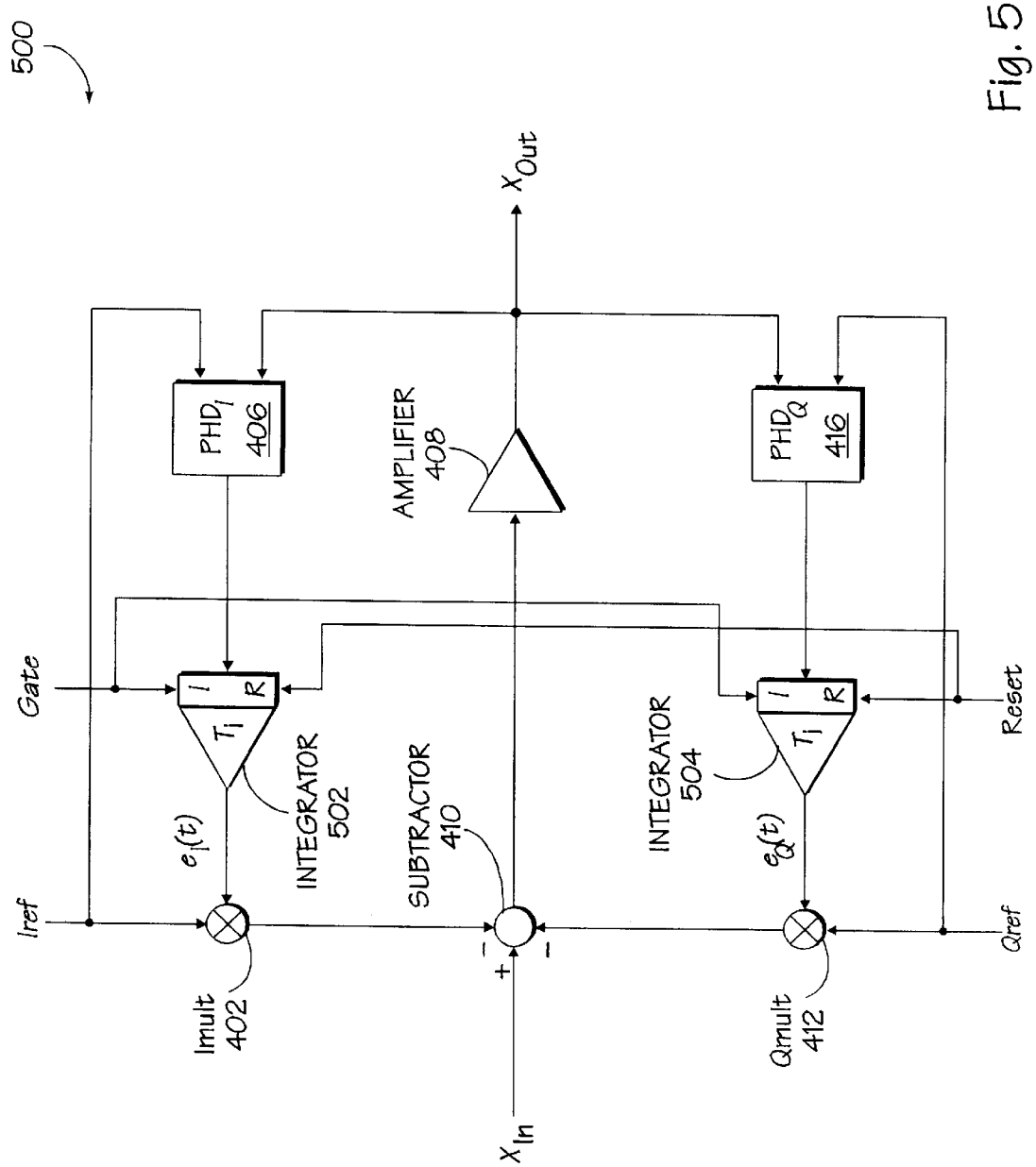
FIG. 5 is a block diagram of a circuit that may be used to process ultrasound signals in an ultrasound system that employs PW Doppler mode, according to one embodiment of the invention.

FIG. 5 is a block diagram of a circuit that may be used to process ultrasound signals in an ultrasound system that employs PW Doppler mode, according to one embodiment of the invention. In FIG. 5, an integrator 502 and an integrator 504 are utilized to function as loop regulators to integrate when a "Gate" logic signal is asserted (which may be active-low or active-high). Such an operation may be assumed to occur at approximately a time corresponding to the range gating for PW processing (e.g., the Gate signal may approximately coincide with the Rx-gate shown in FIG. 2A–2B). Thus, the integrators 502 and 504 may store information between subsequent range gates. Due to relatively higher bandwidth associated with PW signals, the dynamic range reduction typically occurs during the time interval when range gating is performed, which, in one embodiment, corresponds to the time when the output signal is used for subsequent processing.

It will be appreciated that an embodiment such as that shown in FIG. 5, in which gated phase detection is utilized, may also be used in CW Doppler application where the bandwidth of the input signal is relatively smaller than in a PW Doppler mode.

In general, the dynamic behavior of the circuit 500, with respect to determining and removing a component of the input signal, is similar to the circuit 400 described with reference to FIG. 4, which may be operated in CW Doppler mode, with at least one exception: the effective time constant of the notch filter associated with the circuit 500 is typically affected by the gating. Assuming the same phase detector as described above, for example, the value of the time constant with gating employed may be approximated as follows:

$$T_{hp,Gated} = \frac{T_{hp}}{T_{gate} \cdot PRF} \quad (17)$$

wherein $T_{gate}$ represents the duration of the range gate signal, and PRF represents the pulse repetition frequency. It will be appreciated that the gating operation may result in the feedback loop operating slower by a fractional on-time of the integrator.

In many instances, it may be desired to control the effective time constant relatively independent of PRF, range gate duration, etc. Equations (14) and (17) may provide various mechanisms which may be used to compensate for variations of the independent variables, such as changing the amplitude $|r_0|$ of the reference signal, varying the integration time constant $T_i$, etc.

In one embodiment, a reset signal, such as shown in FIG. 5, may be used to clamp an integrator output to zero. Thus, the subtraction circuit may be disabled, for example, during non-Doppler operation.

OVERVIEW OF ONE EMBODIMENT OF THE INVENTION IN A MIXED MODE

As described below, the invention may also be utilized in mixed mode operation. For example, the invention may be embodied in a frame or subframe interleaving system or other types of mixed mode systems.

In certain mixed mode systems, such as ones employing frame or subframe interleaving, some CW transmission may be turned on and off intermittently. Each time the CW transmission is turned on, a relatively large carrier crosstalk/tissue echo signal may suddenly appear at the input amplifier. As a result, a carrier subtraction device (e.g., the subtractor 410) may need some time, perhaps in the order of a 2–3 times $T_{hp}$, to settle. During such time, which may be as much as 10 ms in some implementations, the system may be blocked from operating in a desired manner.

Thus, in one embodiment of the invention, such a loss of time may be reduced by a quick-settling mechanism, which may be added, for example, to the carrier subtraction circuit. In one embodiment of the invention, the effective time constant of the subtraction unit is selected such that it is smaller than its normal value immediately after the Doppler transmission is turned on, and the effective time constant increases somewhat gradually to a normal operating value during a time in the order of $T_{hp}$. As a result, a feedback loop, such as those shown in FIGS. 4 and 5, may be relatively fast initially, allowing it to adjust to the carrier signal relatively quickly. When any existing initial transients decay, the time constant may be increased to a desired value.

In part depending on the implementation of a subtractor circuit, several techniques may be employed to provide dynamic settling. For example, in one embodiment, the amplitude $|r_0|$ of the reference signal is made time dependent. In another embodiment, the integration time constant $T_i$ is made time dependent. Techniques for providing such time dependence are known by those in the art, for example, by using elements such as voltage controlled resistors or capacitors, multipliers, multiplying digital-to-analog (D/A) converters, etc.

OVERVIEW OF ONE EMBODIMENT OF THE INVENTION UTILIZING BASEBAND MIXERS

As indicated above, some ultrasound systems utilize baseband mixers. For instance, systems which employ baseband beam forming typically include one complex demodulator per channel, or possibly, per group of a relatively small number of channels. As such, in one embodiment, quadrature mixers may be combined with the phase detection circuitry. As a result, a relative savings may be provided with respect to the number of components utilized.

Figure 6:
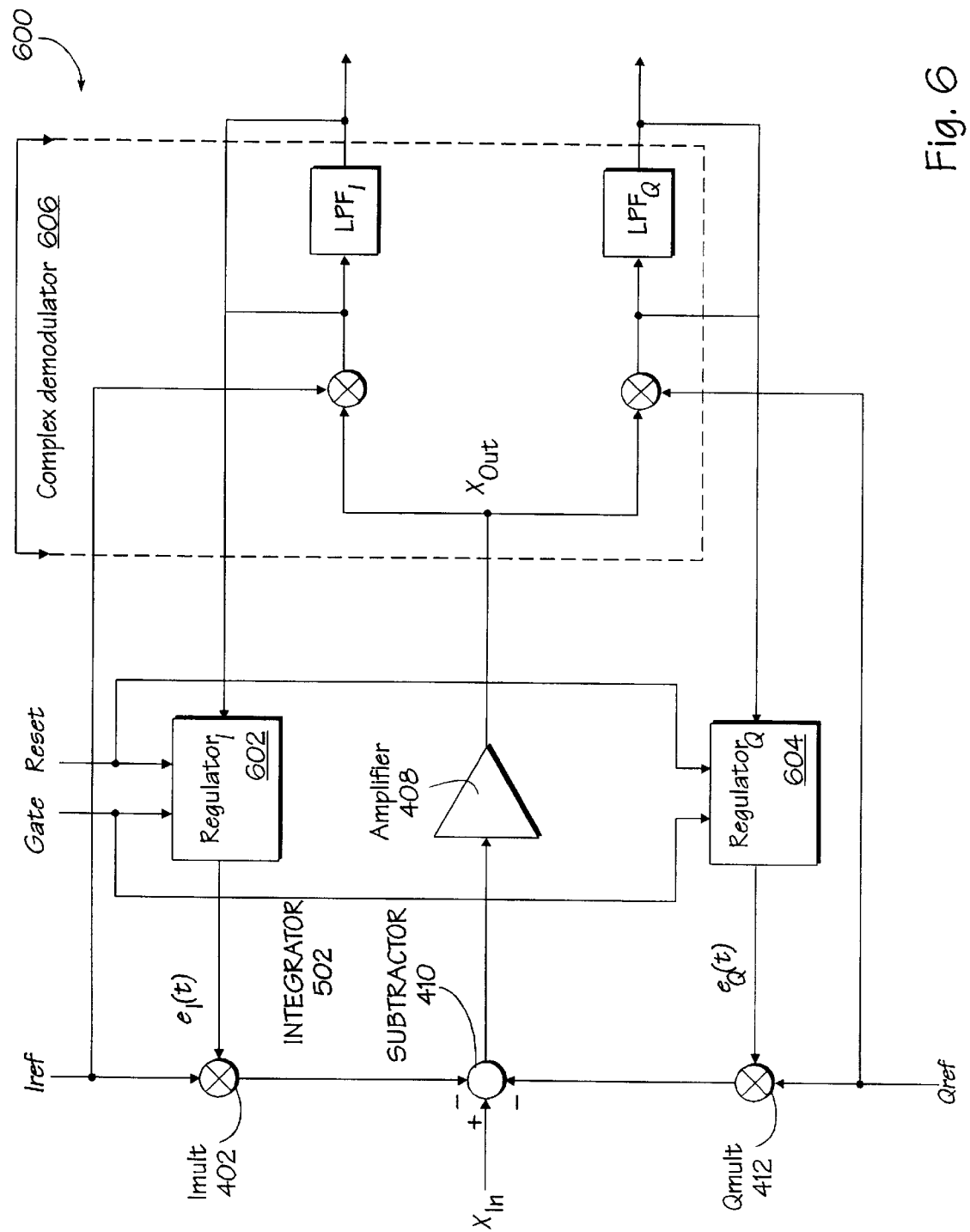
FIG. 6 is a block diagram of a circuit which may be used to process ultrasound signals in an ultrasound system which may employ baseband mixers, according to one embodiment of the invention.

FIG. 6 is a block diagram of a circuit which may be used to process ultrasound signals in an ultrasound system which may employ baseband mixers, according to one embodiment of the invention. As shown by a circuit 600, a regulator 602 and a regulator 604 are coupled to receive feedback signals from a complex demodulator 606. It will be appreciated that the circuit 600 may be used in ultrasound systems which utilize baseband mixers, and in one embodiment, may be especially well-suited for single-channel analog Doppler systems.

OVERVIEW OF ONE EMBODIMENT OF THE INVENTION HAVING A FEED-FORWARD TOPOGRAPHY

Although several of the embodiments described above, for example, with reference to FIGS. 4–6, utilize a feedback topology for generation of an approximation signal, it will be appreciated that a feed-forward, combination of feedback and feed-forward, or other type of topology may be used in alternative embodiments of the invention.

Figure 7:
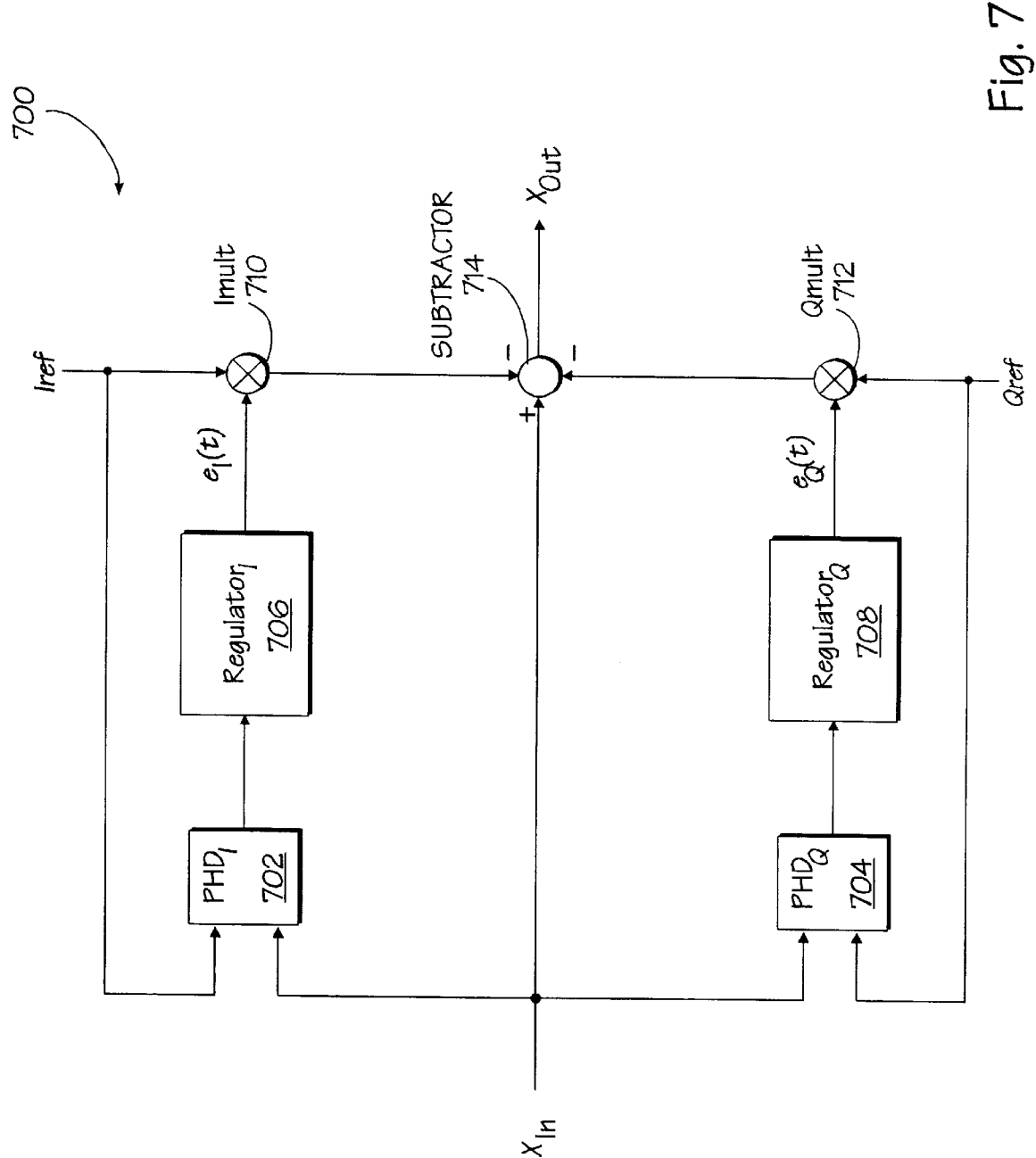
FIG. 7 is a block diagram of a circuit having a feed-forward topology and which may be used to process ultrasound signals in an ultrasound system, according to one embodiment of the invention.

FIG. 7 is a block diagram of a circuit having a feed-forward topology and which may be used to process ultrasound signals in an ultrasound system, according to one embodiment of the invention. The circuit 700 shown in FIG. 7 differs, for example, from the circuit 400 shown in FIG. 4, since the subtraction is performed in a feed-forward topography rather than by feedback. It will be appreciated that a feed-forward topology, such as the one shown in the circuit 700, may also be utilized in mixed, PW Doppler, CW Doppler, and other systems, as well.

As shown in FIG. 7, the circuit 700 includes a regulator 706 and a regulator 708. If the frequency response of the regulators is $H_{Reg}(\omega)$, and maintaining conditions similar to those described above, for example, with reference to equations (9) and (10), the transfer function of the effective filter may be expressed as:

$$H(\omega) = 1 - \frac{|r_0|^2}{2} H_{Reg}(\omega_d) \qquad (18)$$

Assuming that the regulator transfer function is a first-order low-pass filter such that:

$$H_{Reg}(\omega) = \frac{1}{1 + j\omega T_{hp}} \cdot \frac{2}{|r_0|^2} \qquad (19)$$

the output signal from the carrier subtractor 714 may be described by equation (11) as:

$$H(\omega_d) = \frac{j\omega_d T_{hp}}{1 + j\omega_d T_{hp}} \qquad (20)$$

which is identical to equation (13).

Several of the above-described aspects of the invention and relating considerations, such as gating and or quick-settling techniques which may be employed in mixed modes, may be equally relevant in an embodiment of the invention wherein a feed-forward topology is utilized.

ALTERNATIVE EMBODIMENTS OF THE INVENTION

It will be appreciated that the invention may utilize, it its various embodiments, a number of various types of circuitry and techniques. For instance, in embodiments wherein a phase detector is used in the generation of an approximation signal, a number of types of phase detectors may be employed. As such, it will be appreciated that the implementation of the phase detector is not limited to certain types, such as linear multiplier phase detectors. In one embodiment of the invention, a nonlinear phase detector is utilized, such that:

$$PHD_{out}(t) = g_1(input_1(t)) \cdot g_2(input_2(t)) \qquad (21)$$

wherein $g1(\bullet)$, $g2(\bullet)$ are chosen as nonlinear, antisymmetrical and monotonical functions (e.g. sigmoids).

In one embodiment, a sign-mixer is provided, which may be obtained by selecting the sign-function for $g_1$, and selection $g_2$ to be linear.

$$g_1(\bullet) = sgn(\bullet) = \begin{cases} 1 & (\bullet) > 1 \\ -1 & (\bullet) < 1 \end{cases} \qquad (22)$$

$$g_2(\bullet) = (\bullet)$$

In this embodiment, $input_1(t)$ generally should be coupled to a reference, and $input_2(t)$ may be coupled to an amplifier. As a result, the signal amplitude at the amplifier may be preserved at the output of a mixer. The dynamic behavior may be described by equation (13), and the time constant may be expressed as:

$$T_{hp} = \frac{\pi \cdot T_i}{2 \cdot A \cdot |r_0|} \qquad (23)$$

In yet another embodiment of the invention, phase detection is performed by quadrature sampling, wherein $x_{out}(t)$ may be sampled at two consecutive time intervals, 90° apart relative to the carrier, and the sampling frequency is equal to the carrier divided by some suitable integer M. For example, if $Iref = \cos\omega_0 t$, the quadrature sampling scheme may be described as:

$$PHD_I(t) = \sum_n x_{out}(t) \cdot \delta\left(t - \frac{2\pi M}{\omega_0} n\right) \qquad (24)$$

$$PHD_Q(t) = \sum_n x_{out}(t) \cdot \delta\left(t - \left(\frac{\pi}{2\omega_0} + \frac{2\pi M}{\omega_0} n\right)\right)$$

wherein $\delta(\bullet)$ is the Kronecker delta (sampling) function. Such a scheme generally corresponds to a gated variation of the phase detector described in (21), wherein $g_1(\bullet)$ is non-zero at the value where the reference signal reaches its peak value, and gating is performed with a frequency $f_0/M$.

Thus, it will be appreciated by those in the art that several other types of phase detection schemes may be employed in alternative embodiments of the invention. Similarly, other elements of the invention described above may be implemented with various types of circuitry, integrated with other circuitry, or in some embodiments, not utilized. For example, a regulator which may be employed in some of the embodiments of the invention is not necessarily limited to an integral regulator (feedback) or 1st order low-pass (feed-forward), as described above with some of the embodiments of the invention. It will be appreciated to those in the art that several other types of regulators (e.g. proportional regulators, regulators using higher-order dynamic elements, etc.) may be employed, in embodiments of the invention wherein a regulator is utilized. Therefore, the dynamic behavior of the regulator may be used to generate alternate shapes of the transfer function $H(\omega_d)$. At least two properties about the regulator which may be of interest in some embodiments of the invention include: (1) the transfer function having a relatively substantial attenuation for relatively small $|\omega_d|$; and (2) attenuation is relatively insubstantial when $|\omega_d|$ is relatively large (e.g., in the range of the desired Doppler shifts, for example, from blood).

In one embodiment, a processing stage(s), such as the feedback scheme described above, may be at least partially implemented in the digital domain. For example, in the circuit 400 described above with reference to FIG. 4 and one embodiment of the invention, an A/D converter may be coupled to the output of the amplifier 408. Additionally, the PHD 406 or 416, the regulator 404 or 414, and the reference multipliers Imult 402 and Qmult 412 may employ digital circuitry as well. In one embodiment employing digital circuitry, the two components of the approximation signal may be generated by two D/A converters.

While the invention has been described in terms of several embodiments, those skilled in the art will recognize that the invention is not limited to the embodiments described. In particular, the invention can be practiced in several alternative embodiments that provide removal of an undesirable component of an input signal based on generating an approximation to the undesirable component, which approximation is used for such removal. Thus, it will be appreciated that the invention may be practiced in several embodiments, using various types and configurations of circuitry and signal processing techniques, to generate an approximation signal which is used to remove an undesirable component of an input signal.

Therefore, it should be understood that the method and apparatus of the invention can be practiced with modification and alteration within the spirit and scope of the appended claims. The description is thus to be regarded as illustrative instead of limiting on the invention.

What is claimed is:

1. A circuit in an ultrasound system to process signals within the frequency band of a Doppler signal, said circuit comprising:
    an input circuit to receive an input signal, said input signal comprising a first component and a second component;
    a signal generator coupled to said input circuit, said signal generator generates an approximation signal of said first component; and
    a subtractor coupled to said input circuit and to said signal generator, said subtractor subtracts said approximation signal from said input signal to provide an output signal, wherein said output signal represents an approximation of said second component.

2. The circuit of claim 1, wherein said first component of said input signal comprises a low-Doppler shift component.

3. The circuit of claim 1, wherein said input signal is associated with Doppler signals.

4. The circuit of claim 1, wherein said signal generator comprises:
    a first comparator having a first input coupled to said output signal and a second input coupled to a first reference signal; and
    a second comparator having a first input coupled to said output signal and a second input coupled to a second reference signal.

5. The circuit of claim 4, wherein:
    said first comparator comprises an output to provide, based on a comparison of signals provided at said first and second inputs of said first comparator, a first component of said approximation signal; and
    said second comparator comprises an output to provide, based on a comparison of signals provided at said first and second inputs of said second comparator, a second component of said approximation signal.

6. The circuit of claim 5, wherein said approximation signal comprises a combination of said first and second components of said approximation signal.

7. The circuit of claim 1, further comprising a beam former, coupled to receive said output signal.

8. The circuit of claim 7, wherein said beam former comprises digital signal processing circuitry.

9. The circuit of claim 8, further comprising a display, coupled to said beam former, to display an image based on said output signal.

10. The circuit of claim 1, wherein said circuit is associated with a continuous wave (CW) Doppler imaging system.

11. The circuit of claim 6, wherein said first and second comparators each include phase detection circuitry.

12. The circuit of claim 11, further comprising a first regulator coupled to said output of said first comparator and a second regulator coupled to said output of said second regulator.

13. The circuit of claim 11, further comprising a integrator coupled to said output of said first comparator and a second integrator coupled to said output of said second regulator.

14. A method in an ultrasound system to process signals within the frequency band of a Doppler signal, said method comprising:
    receiving an input signal, said input signal comprising a first component and a second component; and
    generating an approximation signal to subtract from said input signal to provide an output signal, wherein said approximation signal represents an approximation of said first component, and wherein said second component represents the output signal.

15. The method of claim 14, wherein said first component of said input signal comprises a low-Doppler shift component.

16. The method of claim 14, wherein an amplitude associated with said first component of said input signal is relatively larger than an amplitude associated with said second component of said input signal.

17. The method of claim 14, further comprising:
    comparing said output signal to a first reference signal to generate a first result;
    comparing said output signal to a second reference signal to generate a second result; and
    based on said first and second results, generating said approximation signal.

18. The method of claim 17, further comprising combining said first result with said second result to generate said approximation signal.

19. The method of claim 14, further comprising:
    providing said output signal to a beamformer for processing said output signal for generating a display.

20. The method of claim 14, further comprising displaying an image based on said output signal.

21. The method of claim 20, wherein said image is associated with a continuous wave (CW) Doppler imaging system.

22. The method of claim 20, wherein said image is associated with a pulsed wave (PW) Doppler imaging system.

23. An apparatus for processing Doppler signals associated with an ultrasound imaging system, said apparatus comprising:
    input means for receiving a Doppler signal; and
    circuit means for generating an output signal to be used for generating a display, said circuit means comprising:
        generating means for generating an approximation signal corresponding to at least a first Doppler shifted component of said Doppler signal; and
        output means for receiving said approximation signal and said Doppler signal, said output means generating said output signal, said output signal represents said Doppler signal having an approximation of said first Doppler shifted component substantially removed therefrom.

24. The apparatus of claim 23, wherein said first component of said input signal comprises a low-Doppler shift component.

25. The apparatus of claim 23, said circuit means further comprising:
    a first comparing means for comparing said output signal to a first reference signal for generating a first result;

a second comparing means for comparing said output signal to a second reference signal for generating a second result; and based on said first and second results, said generating means generating said approximation signal.

26. The apparatus of claim 25, wherein said generating means comprises combining means for combining said first result with said second result.

27. The apparatus of claim 23, further comprising:

means for generating a display based on said output signal.

28. A method to reduce the dynamic range of signals processed in an ultrasound system, said method comprising:

generating an approximation signal which indicates a component of a Doppler signal; and based on said approximation signal, removing said component from said input signal.

29. The method of claim 28, wherein said component of said input signal comprises a low-Doppler shift component.

30. The method of claim 28, wherein at least one of said generating said approximation signal and said removing said component from said input signal is performed dynamically.

31. The method of claim 28, further comprising:

determining, based on a reference signal, said approximation signal.

32. The method of claim 28, further comprising:

generating an output signal representing said input signal having said component removed therefrom; and providing said output signal to a beamformer an ultrasound system.

33. The method of claim 32, further comprising displaying an image based on said output signal.

34. The method of claim 33, wherein said image is associated with a continuous wave (CW) Doppler imaging system.

35. The method of claim 33, wherein said image is associated with a pulsed wave (PW) Doppler imaging system.

36. The method of claim 28, wherein removing said component from said input signal comprises a subtraction of said approximation signal from said input signal.

37. A dynamic range reduction circuit to process an input signal associated with an ultrasound system, said input signal comprising a first Doppler shifted component and a second Doppler shifted component, said circuit comprising:

a signal generate or to generate an approximation signal to approximate said first Doppler shifted component of said input signal; and a subtractor coupled to an input circuit and to said signal generator, said subtractor subtracts said approximation signal from said input signal to provide an output signal, wherein said output signal represents an approximation of said second Doppler shifted component of said input signal, and wherein said subtractor comprises a time-dependent settling mechanism.

38. The circuit of claim 37, wherein said ultrasound system is operable in a mixed mode.

39. In an ultrasound diagnostic method for processing echo ultrasound signals reflected from a body, the echo ultrasound signals containing a tissue component and a blood flow component, the method comprising the improvement of:

generating a tissue approximation signal based on at least one quadrature reference signal; and combining an echo ultrasound signal with the tissue approximation signal to substantially remove a tissue component from the echo ultrasound signal to produce an output signal representing an approximation of a blood flow component of the echo ultrasound signal.

40. The method of claim 39, further comprising:

generating the tissue approximation signal based on a linear combination of two reference signals that are shifted in phase with respect to one another.

41. The method of claim 39, further comprising:

generating the tissue approximation single based on at least one dynamic reference coefficient; and generating said at least one dynamic reference coefficient based on a comparison of a phase of said output signal with an associated quadrature reference signal.

42. In an ultrasound diagnostic system for processing echo ultrasound signals reflected from a body, the echo ultrasound signals containing a tissue component and a blood flow component, the system comprising the improvement of:

a generator for generating the tissue approximation signal based on at least one quadrature reference signal; and a combiner for combining the echo ultrasound signal with the tissue approximation signal to substantially remove the tissue component from the echo ultrasound signal to produce an output signal representing an approximation of the blood flow component of the echo ultrasound signal.

43. The system of claim 42, further comprising:

a generator for generating the tissue approximation signal based on a linear combination of two reference signals that are shifted in phase with respect to one another.

44. The system of claim 42, further comprising:

a generator for generating the tissue approximation signal based on at least one dynamic reference coefficient, wherein said at least one dynamic reference coefficient is generated based on a comparison of a phase of said output signal with an associated quadrature reference signal.

* * * * *